(12) United States Patent
Sullivan et al.

(10) Patent No.: US 8,924,934 B2
(45) Date of Patent: Dec. 30, 2014

(54) AUTOMATED TEST TOOL INTERFACE

(75) Inventors: Blake Sullivan, Redwood, CA (US); Pavitra Subramaniam, Alameda, CA (US); Mark Yvanovich, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 13/021,668

(22) Filed: Feb. 4, 2011

(65) Prior Publication Data
US 2012/0204091 A1 Aug. 9, 2012

(51) Int. Cl.
*G06F 9/44* (2006.01)
*G06F 11/36* (2006.01)

(52) U.S. Cl.
CPC .................................. *G06F 11/3664* (2013.01)
USPC ......................................... 717/124; 715/716

(58) Field of Classification Search
CPC ......................................................... G06F 9/44
USPC ................... 715/226, 768; 717/124
See application file for complete search history.

(56) References Cited

U.S. PATENT DOCUMENTS

| | | | |
|---|---|---|---|
| 6,052,730 A | 4/2000 | Feliciano et al. | |
| 6,418,471 B1 | 7/2002 | Shelton et al. | |
| 7,716,322 B2 * | 5/2010 | Benedikt et al. | 709/224 |
| 7,934,201 B2 * | 4/2011 | Sweis | 717/124 |
| 8,103,913 B2 * | 1/2012 | Zambrana | 714/38.1 |
| 2003/0009562 A1 | 1/2003 | Heymann | |
| 2003/0037108 A1 | 2/2003 | Peiffer et al. | |
| 2003/0233420 A1 | 12/2003 | Stark et al. | |
| 2004/0133563 A1 | 7/2004 | Harvey et al. | |
| 2004/0193699 A1 | 9/2004 | Heymann | |
| 2005/0071464 A1 | 3/2005 | Kuwata et al. | |
| 2005/0091510 A1 * | 4/2005 | McKeon et al. | 713/185 |
| 2005/0228621 A1 | 10/2005 | Matsuo et al. | |
| 2006/0005132 A1 * | 1/2006 | Herdeg, III | 715/704 |
| 2006/0031781 A1 | 2/2006 | Keohane et al. | |

(Continued)

FOREIGN PATENT DOCUMENTS

EP 1041496 A2 10/2000

OTHER PUBLICATIONS

Wessendorf, Introduction to Oracle's ADF Faces Rich Client Framework, pp. 1-5, published Jan. 22, 2009.*

(Continued)

*Primary Examiner* — Stephen Hong
*Assistant Examiner* — Ahamed I Nazar
(74) *Attorney, Agent, or Firm* — Kilpatrick Townsend & Stockton LLP

(57) ABSTRACT

An automated test tool interface is described. A developer of a reusable web component provides an interface for obtaining an accurate identification of a root element of a component and any sub elements within the root element on a web page. An automated test framework uses this interface when recording automated tests to obtain a stable identification of the element that is independent of the rendering of the component on the web page. When the automated test is played back, the test framework again uses the interface to convert the stable identification of the element to a form that is dependent on the rendering of the component on the web page. Thus, changes in the rendering of a component will no longer cause an automated test tool to fail, as element identification in the testing framework is no longer tied to the specific rendering of the web page.

17 Claims, 10 Drawing Sheets

(56) References Cited

U.S. PATENT DOCUMENTS

| | | | |
|---|---|---|---|
| 2006/0048096 A1 | 3/2006 | Jiang et al. | |
| 2006/0242563 A1 | 10/2006 | Liu et al. | |
| 2006/0279571 A1* | 12/2006 | Mori et al. | 345/443 |
| 2007/0043701 A1* | 2/2007 | Klementiev et al. | 707/3 |
| 2007/0240118 A1* | 10/2007 | Keren | 717/124 |
| 2007/0245231 A1 | 10/2007 | Kibler | |
| 2007/0250601 A1 | 10/2007 | Amlekar et al. | |
| 2007/0271382 A1 | 11/2007 | Douiri et al. | |
| 2008/0092119 A1* | 4/2008 | Sweis | 717/124 |
| 2008/0172598 A1* | 7/2008 | Jacobsen et al. | 715/224 |
| 2008/0183753 A1* | 7/2008 | Maes | 707/104.1 |
| 2008/0195819 A1 | 8/2008 | Dumont | |
| 2008/0313659 A1 | 12/2008 | Eide et al. | |
| 2008/0317347 A1* | 12/2008 | Lim et al. | 382/182 |
| 2009/0006627 A1 | 1/2009 | Castellucci et al. | |
| 2009/0030620 A1 | 1/2009 | Novo et al. | |
| 2009/0049427 A1* | 2/2009 | Zhao | 717/127 |
| 2009/0106769 A1 | 4/2009 | Nakamura | |
| 2009/0198787 A1 | 8/2009 | Broda et al. | |
| 2009/0210498 A1 | 8/2009 | Sze et al. | |
| 2009/0235159 A1 | 9/2009 | Hosoda | |
| 2009/0276488 A1 | 11/2009 | Alstad | |
| 2010/0031153 A1 | 2/2010 | Ortwein et al. | |
| 2010/0174981 A1 | 7/2010 | Jiang et al. | |
| 2010/0211893 A1* | 8/2010 | Fanning et al. | 715/760 |
| 2010/0332920 A1 | 12/2010 | Ashida et al. | |
| 2011/0004665 A1 | 1/2011 | Kim et al. | |
| 2011/0022948 A1 | 1/2011 | Brown et al. | |
| 2011/0137973 A1 | 6/2011 | Wei et al. | |
| 2011/0145698 A1 | 6/2011 | Penov et al. | |
| 2011/0173589 A1* | 7/2011 | Guttman et al. | 717/125 |
| 2011/0191676 A1* | 8/2011 | Guttman et al. | 715/716 |
| 2011/0239104 A1* | 9/2011 | Prasad et al. | 715/234 |
| 2011/0271173 A1* | 11/2011 | Ait-Mokhtar et al. | 715/226 |
| 2012/0084133 A1 | 4/2012 | Ross et al. | |
| 2012/0102392 A1* | 4/2012 | Reesman et al. | 715/243 |
| 2012/0204091 A1* | 8/2012 | Sullivan et al. | 715/234 |

OTHER PUBLICATIONS

Bytes tech community "creating browser tab specific cookie," Dec. 27, 2009, available at http:/lbytes.corn/topic/javascript/answers/878108-creating-browser-tab-specific-cookie, downloaded Feb. 25, 2013.

Tang et al., "Closed-loop load balancing: comparison of a discrete event simulation with experiments", American Control Conference, Proceedings of the 2005 Portland, OR, USA Jun. 8-10, 2005, IEEE, Piscataway, NJ, USA, pp. 2721-2726.

International Search Report and Written Opinion for PCT Application No. PCT/US2012/020104 mailed on Apr. 20, 2012; 12 pages.

International Search Report and Written Opinion for PCT Application No. PCT/US2012/020106 mailed on Mar. 7, 2012; 10 pages.

Final Office Action for U.S. Appl. No. 12/985,805 mailed Sep. 10, 2013, 15 pages.

Non-Final Office Action for U.S. Appl. No. 12/985,805 mailed Feb. 21, 2014, 13 pages.

Final Office Action for U.S. Appl. No. 12/985,799 mailed Oct. 23, 2013, 16 pages.

Final Office Action for U.S. Appl. No. 13/094,549 mailed Jan. 18, 2013, 10 pages.

Non-Final Office Action for U.S. Appl. No. 13/094,549 mailed Aug. 6, 2012, 7 pages.

Non-Final Office Action for U.S. Appl. No. 12/985,805 mailed Feb. 25, 2013.

* cited by examiner

AUTOMATED TEST TOOL INTERFACE

BACKGROUND

Embodiments of the present invention relate to web applications and more specifically to an automated test tool interface.

The World Wide Web ("the Web") has undergone an extraordinary degree of evolution. What began as a simple format for exchanging documents in a platform independent manner has morphed into technology that enables access to a seemingly unlimited amount of information at any time and any place. Web pages today include active content, as provided by browser side scripting languages such as JavaScript. Web pages can be updated in real-time using technologies such as AJAX. Static web pages being served to users via relatively unintelligent web servers have been replaced by dynamically generated web pages that are created on the fly by the web server and which are responsive to input provided by the users.

In a modern web application development environment, a developer may use one or more application development frameworks in order create a web application. A web application may consist of one or more individual web pages and the control logic that determines the flow of those web pages. The web applications developer will design an application, both the visual appearance and the control logic that governs the behavior of the web application, using the application development framework. The application development framework allows the developer to work at a level of abstraction that is higher than the raw HTML code. The web application may then be deployed to a web server.

Once a web application is deployed, a user may access the web application using a web browser. The web application may determine which web page should be displayed to the user. In response, the web server may programmatically generate the determined web page and send the page to the user's browser. The user may then interact with the web application through the displayed web pages.

Users are becoming more and more reliant on web applications in their day to day life. Because of this reliance, users are becoming less and less tolerant of web applications that do not perform properly. One of the best ways to ensure that a web application performs properly is through rigorous testing of the application prior to release to the end user. A testing regime may be developed wherein testers develop a test plan which tests all of the functionality of the web application. If any errors (i.e. bugs) in the operation of the web application are discovered during testing, those errors can be resolved prior to release to the end user.

Although the need for thorough testing of web applications is clear, the testing phase can be extremely costly. A human tester may need to execute the test plan against a web application many times as new errors are discovered and resolved. Each of these iterations requires the time of the tester and can delay deployment of a new web application or of new features in an existing application. In order to alleviate the costs of testing, automated test frameworks have been created. Selenium, provided by SeleniumHQ.org, is an open source example of one such testing framework.

Using a testing framework, a tester may record the execution of the test plan. If the test plan needs to be executed again, the testing framework can replay the previously recorded execution of the test plan. As a result of such automation, the amount of human effort, and thus cost, in testing can be reduced. Unfortunately, currently available automated test frameworks are quite brittle in that minor changes made to a web page as a result of bug fixes can cause the recorded test plan to become invalid and the execution of the test plan to fail.

BRIEF SUMMARY

An automated test tool interface is described. A developer of a reusable web component provides an interface for obtaining an accurate identification of a root element of a component and any sub elements within the root element on a web page. An automated test framework uses this interface when recording automated tests to obtain a stable identification of the element that is independent of the rendering of the component on the web page. When the automated test is played back, the test framework again uses the interface to convert the stable identification of the element to a form that is dependent on the rendering of the component on the web page. Thus, changes in the rendering of a component will no longer cause an automated test tool to fail, as element identification in the testing framework is no longer tied to the specific rendering of the web page.

In one embodiment, a non-transitory computer-readable storage medium storing a plurality of instructions for controlling a processor is provided. The plurality of instructions comprise instructions that cause the processor to provide a Document Object Model independent representation of an element of a component. The plurality of instructions may further comprise instructions that cause the processor to provide a Document Object Model dependent representation of the element of the component. In one aspect, the instructions that cause the processor to provide the Document Object Model independent representation of the element of the component further comprise: instructions that cause the processor to receive, from a testing system, a first identifier that identifies the element of the component that is being tested; instructions that cause the processor to determine, based on the first identifier, a second identifier associated with the element; and instructions that cause the processor to send the second identifier to the test system. In a further aspect, the instructions that cause the processor to provide the Document Object Model dependent representation of the element of the component further comprise: instructions that cause the processor to receive, from the testing system, the second identifier; instructions that cause the processor to determine, based on the second identifier, a third identifier associated with the element; and instructions that cause the processor to send the third identifier to the testing system.

In another embodiment, a method is provided. The method may comprise providing, with a computer, a Document Object Model independent representation of an element of a component; and providing, with the computer, a Document Object Model dependent representation of the element of the component. In one aspect, providing the Document Object Model independent representation of the element of the component further comprises: receiving, from a testing system, a first identifier that identifies the element of the component that is being tested; determining, based on the first identifier, a second identifier associated with the element; and sending the second identifier to the test system. In a further aspect, providing the Document Object Model dependent representation of the element of the component further comprises: receiving, from the testing system, the second identifier; determining, based on the second identifier, a third identifier associated with the element; and sending the third identifier to the testing system.

In yet another embodiment, a system is provided. The system may comprise a processor and a memory coupled to the processor. The memory contains a set of instructions which when executed by the processor cause the processor to: provide a Document Object Model independent representation of an element of a component; and provide a Document Object Model dependent representation of the element of the component. In one aspect, the set of instructions that cause the processor to provide the Document Object Model independent representation of the element of the component further comprises instructions that cause the processor to: receive, from a testing system, a first identifier that identifies the element of the component that is being tested; determine, based on the first identifier, a second identifier associated with the element; and send the second identifier to the test system. In a further aspect, the set of instructions that cause the processor to provide the Document Object Model dependent representation of the element of the component further comprises instructions that cause the processor to: receive, from the testing system, the second identifier; determine, based on the second identifier, a third identifier associated with the element; and send the third identifier to the testing system.

A further understanding of the nature and advantages of the embodiments disclosed herein can be realized by reference to the remaining portions of the specification and the attached drawings.

BRIEF DESCRIPTION OF THE DRAWINGS

In order to more fully understand the present invention, reference is made to the accompanying drawings with the understanding that these drawings are not intended to limit the scope of the claimed invention.

DETAILED DESCRIPTION

In the following description, for the purposes of explanation, specific details are set forth in order to provide a thorough understanding of the embodiments of the invention. However, it will be apparent that the invention may be practiced without these specific details.

Embodiments of the present invention provide an automated test tool interface. The automated test tool interface may be used by an automated test framework when recording tests executed on a web application. The recorded tests are not dependent on a specific rendering of a web page within the web application. In one embodiment, techniques are provided that allow an automated testing framework to utilize the automated test tool interface to record tests that continue to work even if the rendering of the web page changes from when the test is recorded to when the test is played back.

Figure 1:
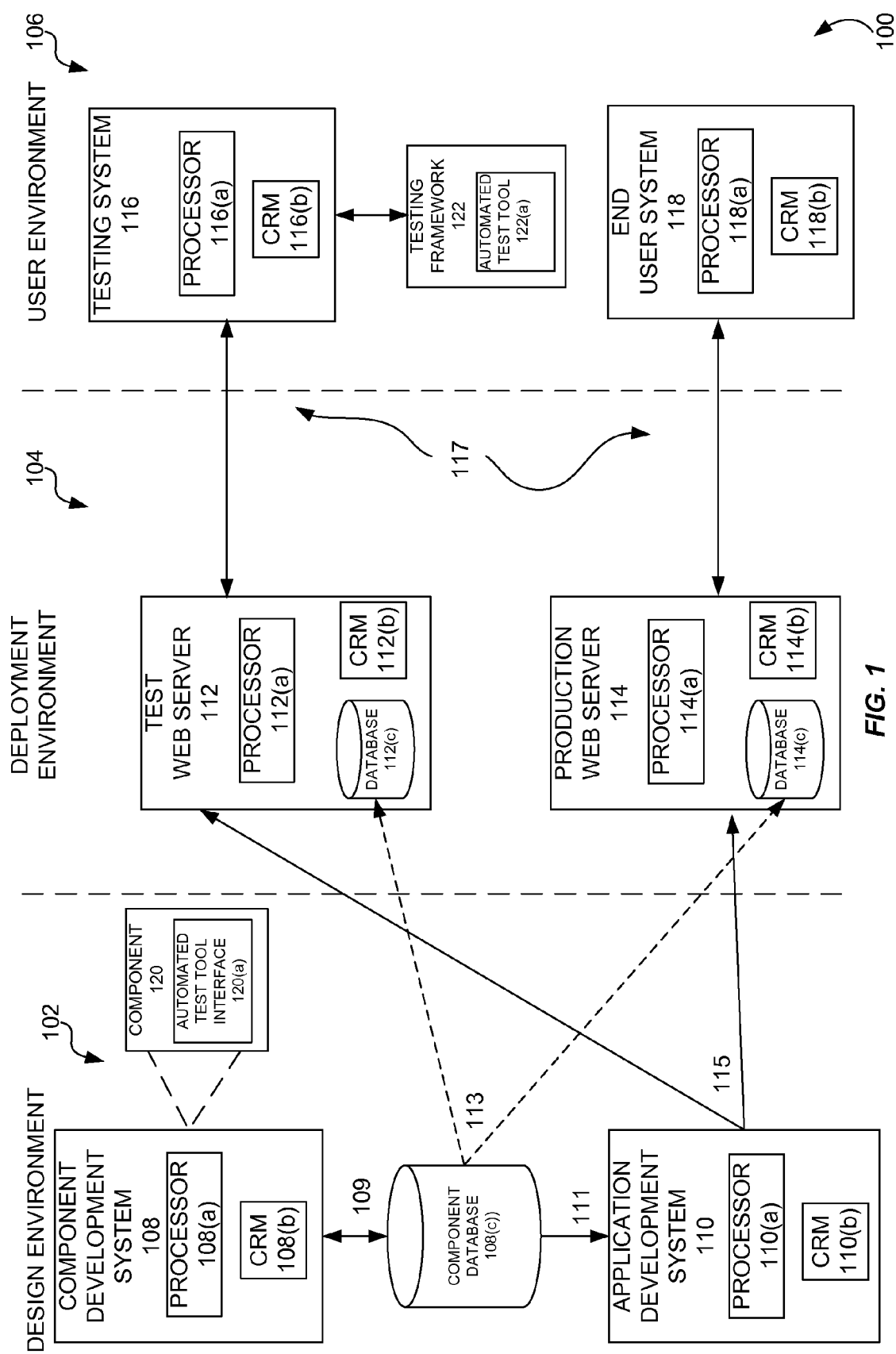
FIG. 1 is a simplified block diagram of a system that may incorporate an embodiment of the present invention.

FIG. 1 is a simplified block diagram of a system 100 that may incorporate an embodiment of the present invention. The embodiment depicted in FIG. 1 is merely an example and is not intended to unduly limit the scope of embodiments of the present invention as recited in the claims. One of ordinary skill in the art would recognize many variations, alternatives, and modifications.

The system 100 as depicted in FIG. 1 can conceptually be divided into a design environment 102, a deployment environment 104, and a user environment 106. Each of these environments 102, 104, 106 may comprise one or more computing systems that are used in implementations of embodiments of the invention. A more detailed description of computing systems is discussed with reference to FIG. 10. The design environment 102 may be used to design and develop web components and package the web components into a library of components. Web pages that use the library of web components may be assembled and grouped into applications. The deployment environment 104 may be used to make the web applications available to users. The user environment 106 may allow users to access web applications from the deployment environment 104. The web pages displayed to the user are rendered by the deployment environment 104 at run time using the library of components and are displayed to the user within the user environment 106 when the user requests a web page.

A web component, also referred to as a component, may provide some defined functionality that is independent of any application that uses the component. For example, a simple date entry component may include functionality to ensure that only valid dates may be entered. The component can then be used by any application that requires a date to be entered and the application is ensured that only valid dates will be accepted. A component may also include functionality that allows the component to communicate with other components or web servers.

The design environment may comprise a component development system 108. The component development system may include a processor 108(*a*) in communication with a non-transitory computer readable medium (CRM) 108(*b*). The CRM 108(*b*) may store computer instructions that when executed by the processor 108(*a*) provide a component developer with a computer environment for developing components 120.

A component may be a building block that is used alone or with other components to create one or more web applications. For example, a component could be as simple as a text entry box or could be more complex, such as a component for producing maps and driving directions. The component development system 108 provides the component developer with an environment to design the visual appearance of a component 120 as well as develop the underlying computer code that provides the functionality of the component 120. Once the component developer has completed the design and development of a component 120, the component 120 may be stored 109 in a component database 108(*c*). The component development system 108 also provides the ability for the component developer to retrieve 109 previously stored components and modify the components as desired.

The component database 108(c) may store information for multiple components and be referred to as a component library. The component database 108(c) may contain any number of components that can be used by any number of web applications. There are numerous application development frameworks that provide component libraries for use in developing web applications. Once such component library is the Application Developer Framework (ADF) Faces component library provided by Oracle™ Corporation, of Redwood Shores, Calif.

In one embodiment, the functionality of a component is extended by providing an automated test tool interface 120(a). Systems, such as testing systems 116, may provide testing frameworks 122 that include automated test tools 122(a). Automated test tools 122(a) may provide the ability to create robust and reusable automated tests of web applications. The automated test tools 122(a) may use the automated test tool interface 120(a) to ensure the tests function correctly, even if the component, or a web application that uses the component, changes. The automated test tool interface is included within the functionality of each of the components stored in the component database 108(c). The automated test tool interface 122(a) will be discussed in further detail below.

A web application, also referred to as an application, provides some desired functionality to a user and interacts with the user through one or more web pages. The application developer may specify the visual appearance of the web pages that make up an application, as well as the control logic that determines when each of those web pages is sent to the user. The application developer may use components from a component library when designing the web application.

The system 100 may also include an application development system 110. The application development system 110 may include a processor 110(a) in communication with a non-transitory computer readable medium (CRM) 110(b). The CRM 110(b) may store computer instructions that when executed by the processor 110(a) provide an application developer with a computer environment for developing web applications.

For example, the CRM 110(a) of the application development system 110 may contain instructions that provide an application developer with a development environment that may be used to design and develop a web application. An application may be designed and developed using one or more components. The application developer may select 111 components from the component database 108(c) to use in the application. In some cases, the application developer may be able to customize or configure the components as per an application's requirement. The application development environment is described in further detail with respect to FIG. 3.

Embodiments of the present invention provide an automated test tool interface that is transparent to the application developer. Because the automated test tool interface is transparent to the application developer, the application developer is relieved of any concerns related to the details of automated tests that may be performed on the application. The application developer's efforts can be focused on the application, as opposed to testing of the application.

The deployment environment 104 is the environment in which an application developer makes an application available for use. The deployment environment may comprise one or more web servers which send the web pages of an application to an end user. The web servers in the deployment environment may generate the needed web pages, as defined by the application, and send those pages to the end user.

The deployment environment 104 may comprise multiple deployment systems. For example, a test web server 112 and a production web server 114. In general, the functionality of each of these systems is very similar, with the main difference being the intended end user. The test web server 112 may comprise a processor 112(a) and a CRM 112(b). Likewise, the production web server 114 may comprise a processor 114(a) and a CRM 114(b) 114(b). The CRMs may contain computer instructions that when executed by the processor of the respective deployment system causes the processor to make applications available to end users.

The test web server 112 and production web server 114 may also include databases 112(c), 114(c) that generally mirror 113 the components stored in the component database 108(c). Thus, the components used by application developers are also available within the deployment environment. An application developer may deploy 115 an application to one of the deployment systems. The typical end user of an application deployed to a test web server 112 will be an application tester, who is tasked with ensuring the functionality of the application is adequate. The typical end user of an application deployed to a production web server 114 will be a user who desires to use the functionality of the application, whatever that functionality might be.

The user environment 106 is the environment in which users interact with the deployment environment 104 in order to access an application. The servers in the deployment environment 104 will typically receive a request from the user environment 106 indicating that the user wishes to utilize a web application. The servers in the deployment environment will provide web pages that are generated as specified by the developer of the application. The deployment environment 104 may receive input from the user environment 106 through the application and generate appropriate web page output as specified by the application developer. The web pages generated in the deployment environment are typically generated using the components that are stored in the respective databases 112(c), 114(c).

The user environment 106 may comprise testing systems 116 and end user systems 118. Both of these systems may contain a processor 116(a), 118(a) and CRM 116(b), 118(b). The respective CRMs may contain instructions that when executed by the processor cause the processor to allow the end user or test system user to access 117 web applications in the deployment environment. Typically, the CRMs will contain instructions that implement a web browser, also know more simply as a browser, to interact with the web pages produced by the application through the deployment environment.

An end user is typically a user that desires to utilize the functionality of an application. The end user is typically not involved in the design, development, or testing of components or applications. An end user may use an end user system 118 to access an application that has been deployed to production web server 114. There are various different ways in which the end user can access the application. In one embodiment, the end user may use a browser executing on end user system 118 to connect to the production server that hosts the application to be accessed. The production server generates web pages and provides them to the end user in accordance with the design specified by the application developer.

A tester may use a test system 116 to test web applications. Test system 116 may include testing frameworks 122, such as Selenium, that provide automated test tools 122. As mentioned above, the automated test tools 122 can include the tools that allow for recording and playback of tests of web applications. In one embodiment, an automated test tool interface 120(a) is provided by a component and is used by the automated test tools 122(a) to provide improved functionality to the testers for recording user actions commonly performed in the web application by an end user. The user actions may be recorded once and then played back as many times as desired. As mentioned above, a tester is responsible for developing a test plan(s) to check the functionality of a web application. As errors, often referred to as bugs, are found, those errors are reported to the component developer or the application developer, depending on where the error is found.

The application or component developer then locates the error, often referred to as debugging, and corrects the error. Once the error is corrected, the application may be deployed again, and the tester repeats the test plan to ensure that all bugs have been resolved, and no new bugs have been introduced. The cycle continues until the web application is sufficiently bug free for deployment to a production web server 114, such that the application may be utilized by end users.

As described above, the deploy-test-debug cycle may repeat numerous times. The test user is generally repeating the exact same test plan in each test phase, and as such the repetitive nature of the test cycle calls out for an automated solution. Testing system 116 may embody a test framework 122 that includes automated test tools 122(a) that allow a test user to record the particular inputs provided to the application for later playback. For example, a test plan may state that a particular element of a component on a web page of an application should be clicked and particular data should be input to the element. The result of the input, whether it be the input is rejected or a different page is displayed, is verified as matching the expected result. If the result does not match the expected result, it may indicate the presence of a bug.

The next time the test plan described above needs to be run, the testing framework 122 may allow the previously recorded test to be played back. The testing framework 122 may programmatically recreate the input that was provided by the user when the test was recorded and compare the results with what is expected. Again, if the results do not match what is expected, there may be bug.

Although existing testing frameworks may provide the ability to record and playback tests, the capabilities are somewhat limited. Typically, testing frameworks record tests that are highly dependent on how the web pages of an application are rendered within a browser that is being used to record the test. For example, the testing framework may rely on the a DOM representation of the web page when recording tests on that web page. Unfortunately, as part of the deploy-test-debug cycle, the DOM representation of a web page may change as bugs are found and corrected. The DOM also may change as changes are made to the components that make up an application and the application itself, even if those changes are not directly related to bug correction. If the recorded tests are dependent on the DOM representation of the specific web page under test, a test that has been recorded for a particular DOM representation may no longer work if the specific DOM of the web page has changed.

Embodiments of the invention advantageously provide an automated test tool interface 120(a) that allows for a testing framework to record tests that continue to work, even if the DOM of the web page of an application that was used to record the test changes when the test is being played back. The automated test tool interface 120(a) allows the test framework 122 to provide to the automated test tool interface 120(a) a DOM dependent identifier associated with a particular test action being recorded. The automated test tool interface 120(a) than returns an identifier, referred to as a stable locator, that is associated with the DOM dependent identifier, but that is not dependent on the DOM. The testing framework 122 through the automated test tools 122(a) then records the DOM independent identifier.

When the time to play back the test arrives, the test framework 122 again interacts with the automated test tool interface 120(a) and provides the DOM independent identifier. The automated test tool interface 120(a) then returns an identifier that is once again DOM dependent. The test framework 122 through the automated test tools 122(a) can then use this DOM dependent identifier to run the recorded test. The automated test tool interface 120(a) masks any changes to the DOM that were caused by bug fixes or other changes to components or applications. The operation of the automated test tool interface 120(a) is described in further detail below.

Although the system 100 described in FIG. 1 depicts individual computers for component development 108 and application development 110, it should be understood that both of these functions may be executed on a single computer. Likewise, deployment environment 104 depicts a separate test web server 112 and production web server 114. Again, these two functions may actually reside on a single computer. The same applies to the user environment 106. It should be understood that FIG. 1 is merely exemplary. Embodiments of the invention contemplate any number of computers that execute any number of the functions described above.

A high level description of an embodiment of the invention may begin with a component developer using a component development system 108 to develop a web component 120. The component developer may provide an automated test tool interface 120(a) in the form of an application programming interface (API) to the component 120. The automated test tool interface 120(a), also referred to as the API, when given an identifier that represents an element of the component 120 as rendered by a web browser, may return another identifier that is not dependent on how the component 120 is rendered. The API may be published, such that it is accessible for external systems.

An application developer may use the component 120 when creating a web application. A test engineer may use a testing framework 122 that includes automated test tools 122(a) that provides the ability to record the testers input to test the application. The test engineer may execute and record a test plan on the web application to ensure the web application functions correctly. The recorded tests in the testing framework 122 may be dependent on the specific rendering of a web page in a browser. The testing framework 122 may use the published API 120(a) to convert the recorded test into a format that is not dependent on the specific rendering of the web page in a browser. The tester may, possibly at a later time, rerun the tests by playing back the previously recorded tests. While playing back the tests, the test framework 122 through the automated test tools 122(a) may again access the published API 120(a) of the web component to convert the recorded tests back to a form that is again dependent on the specific rendering of the web page in a browser.

In so doing, the testing framework 122 is no longer dependent on a specific rendering of a web page in order to record or playback tests. Testing frameworks are made more robust, because tests can be recorded in a format that is independent of how the web page is rendered. Even if the rendering of a web page changes from when the test is initially recorded to when it is played back, embodiments of the invention allow for the recorded test to continue working, without modification.

Figure 2:
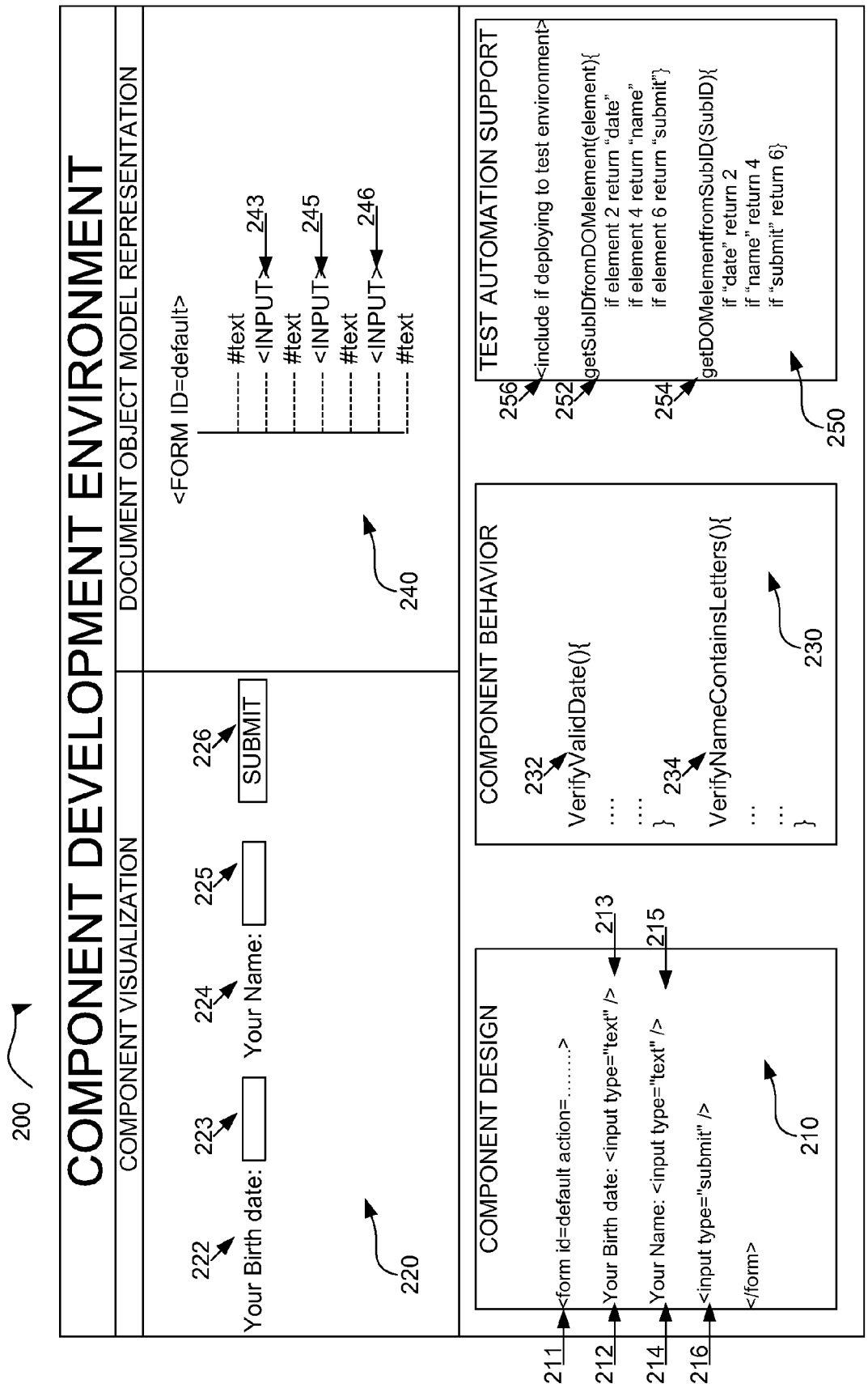
FIG. 2 depicts a graphical representation of an exemplary component development environment.

FIG. 2 depicts a graphical representation of an exemplary component development environment. Although FIG. 2 depicts a graphical component development environment, embodiments of the invention are not so limited. Any component development environment, including graphical, text based, and integrated has been contemplated.

The exemplary component development environment 200 depicted in FIG. 2 may be broken down into several areas of function. Component design window 210 may provide the component developer with a window or windows wherein the component developer may design the visual representation of a component. Associated with component design window 210 may be a component visualization window 220. Component visualization window 220 may be used to display to the component developer what a component will look like when it is actually rendered by a web browser. Along with component visualization window 220, the component development environment 200 may also provide a Document Object Model (DOM) representation window 240. DOM representation window 240 may display the Document Object Model representation of the component being designed as it would exist in a browser that is displaying the component.

A component behavior window 230 may also be provided. In component behavior window 230, the component developer may specify the functionality of the component being designed, and provide computer code that when executed, provides that functionality. Finally, the component development environment 200 may provide a test automation support window 250 that allows the component developer to define the automated test tool interface as used in embodiments of the invention.

As shown in FIG. 2, a component developer may be developing a simple web component that takes in two inputs, a birth date and a name, and provides a submit button, such that the inputs received using the component (i.e., birth date and name) are provided to the web server upon selecting the submit button. The component described in FIG. 2 will, for purposes of this description, be referred to as the name/date component. The component developer may use the component design window 210 to specify the elements of the component. The elements of a component may include standard HTML elements, such as input forms, image tags, and the like. Furthermore, the elements of a component can also be other components, such that more complex components can be created from more basic components. In the example of FIG. 2, the component developer may specify that the name/date component contains a form element 211, with an id set to a default value and no action specified. It may not be necessary for the component developer to specify the id of the form component, or the actions performed when the form is submitted, as this functionality will be added by the application developer, which will be discussed with reference to FIG. 3.

The component developer may continue to specify all of the elements of the component, such as the text strings "Your Birth date" 212, "Your Name" 214. The component developer may also specify input elements, for receiving input. Here, two input elements 213, 215 are defined, with a type of text. The component developer may also include a submit element 216, which allows input gathered in the form to be sent to a web server. Although component design window 210 is depicted as a text environment, this is simply for purposes of explanation and is not intended to be limiting. Some component development environments may be graphical, in which a component developer drags and drops individual elements or other components into the component design window 210.

The component visualization window 220 may display the name/date component as it would appear when rendered in a web browser. Here, the text strings 212 and 214 are displayed as text 222 and 224 respectively. The input elements 213 and 215 are displayed as input boxes 223 and 225. Finally, the submit element 216 is displayed as a submit button 226. The purpose of the input visualization window 220 is to allow the developer to see what the component being designed will look like when it is actually used in a web application.

The component developer may also provide behavior for the component in a component behavior window 230. The component behavior window is where the code that provides the functionality of the component may be provided. As shown in the example of FIG. 2, the component developer has specified two pieces of functionality for the general behavior of the component. A VerifyValidDate 232 function has been specified to ensure that only valid dates are entered in the birth date input element of the component and a verifyNameContainsLetters 234 function has been specified to ensure that only letters are included in the name input element. Any other functionality provided by the component may also be specified in the component behavior window 230.

DOM representation window 240 may display a DOM representation of the name/date component as it would be rendered by a web browser. Each element as described in component design window 210 and component visualization window 220 will have an equivalent representation in the DOM representation. For simplicity of explanation, only the input and submit elements will be described, but it should be understood that every element of a component has an equivalent DOM representation. Here, input elements 213, 215 visualized as input boxes 223, 225, are represented in the DOM as INPUT 243, 245. Likewise, the submit element 216, visualized as a submit button 226, is represented in the DOM as another INPUT 246. The DOM representation window may be provided as a convenience to the component developer to visualize how the component will be rendered in the DOM of a browser. However, this convenience is not required, especially for a sophisticated developer who fully understands the DOM representation of the component.

Test automation support window 250 is where the bulk of the functionality of embodiments of the invention may be defined. Test automation support window 250 is where the automated test tool interface, (i.e. the API) is defined. As mentioned above, existing test frameworks generally record tests based on the DOM representation of component of web page of an application that is being tested. However, the DOM representation is not necessarily static, and can change as changes are made to the underlying components and application.

Embodiments of the present invention overcome the problem of an non-static DOM through the automated test tool interface. The use of the automated test tool interface will become more clear below, but for purposes of the component development environment, it should be understood that each component may provide two pieces of functionality. These two pieces of functionality may be published as an API that is accessible by the testing framework.

First, each component should provide an interface that, given a DOM representation of an element of the component, will return an identifier that is not dependent on the DOM representation. This identifier may be referred to as a stable locator, or a stable locator string. Essentially, a stable locator is an identifier that can be used to identify a particular element of a component, and does not change even if the DOM representation changes.

As shown in FIG. 2, the component developer may provide one or more functions 252 to convert a DOM representation of an element of the component into a stable locator. For example, the second element 243 of the DOM representation of the name/date component described in FIG. 2 is associated with the birth date input element 213, 223. Because the component developer designed the component, the component developer is in the best position to map DOM representations to the element of the component. Here, the component developer provides an interface function that, given the second DOM element, will return the stable locator "date." Similarly, the API will return the stable locator "name" for the fourth element 245, and "submit" for the sixth element 246. Although the DOM representation is being described in terms of an integer number, this is for purposes of simplicity of explanation. In operation, the DOM representation of an element may be more complex, such as a representation based on an XPATH locator.

Secondly, each component should provide an interface that, given a stable locator, will return the DOM representation of that element. As shown in FIG. 2, the name/date component developer may provide one or more functions 254 to convert a stable locator representation of an element of the component into the DOM representation of that component. The use of these two pieces of functionality will become more clear as the example continues.

The automated test tool interface will typically only be used when an application, or the components that make up the application, are deployed to a test web server. Thus, the code corresponding to the automated test tool interface may only be included 256 in the application when the application is deployed to a test web server. This allows for a smaller amount of code to be deployed to production web servers, as the automated test tool interface need not be included. However, some embodiments of the invention will always include the automated test tool interface in all deployments.

Figure 3:
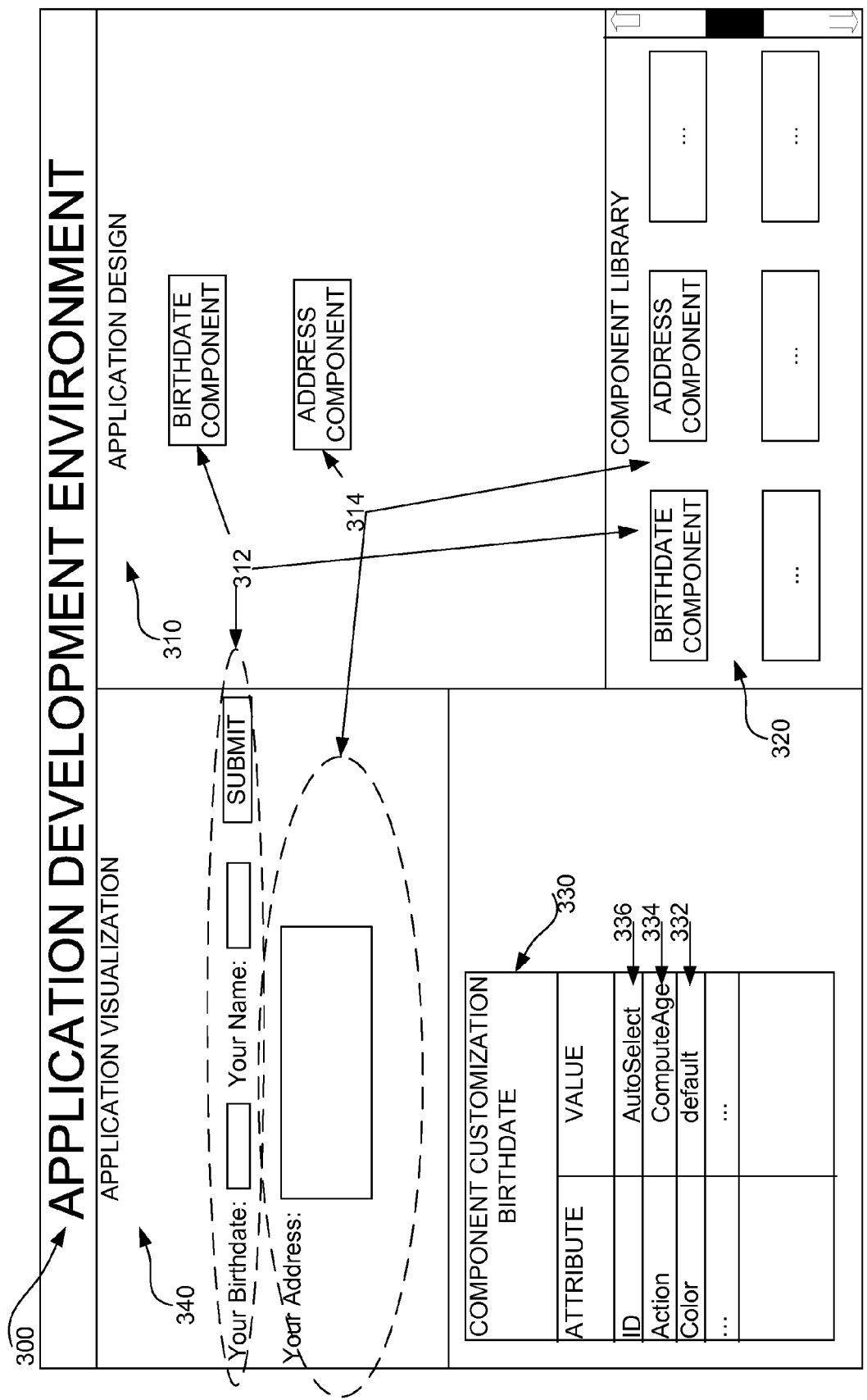
FIG. 3 depicts a graphical representation of an exemplary application development environment.

FIG. 3 depicts a graphical representation of an exemplary application development environment. The description of application development environment 300 is included for purposes of completeness and clarification of an embodiment of the invention. In operation, the automated test tool interface is transparent to the application development environment 300 as well as the application developer. This transparency allows the application developer to focus on developing the application, without being distracted by the need to provide support to any automated testing frameworks. Although application development environment 300 is described as a graphical environment, it should be understood that this is not limiting. Any suitable application development environment 300, including text based environments, has also been contemplated.

Application development environment 300 may include a application design window 310. The application developer may drag and drop components from a component library 320 into the application design window 310. The application developer may customize the selected components in component customization window 330. Application visualization window 340 may allow the application developer to visualize the web pages that will be produced by the application. In addition, the application development environment 300 will also allow the application developer to specify the logic that will control the application. The application logic may define the flow of web pages and any business logic that controls the functions of the application.

In the example of FIG. 3, the application developer is creating an application that utilizes two components, the name/date component 312 and an address component 314. The name/date component 312 may have been created as was described with reference to FIG. 2. The application developer may have selected these two components from a component library 320. As shown, component library 320 may contain any number of additional components. For example, component library 320 may allow the application developer to select any of the components that exist in component database 108 (c).

The application developer may also customize and configure the components in a component customization window 330. In this window, the application developer may customize the component to the extent allowed for by the component developer. For example, the component developer may allow the application developer to specify certain characteristics of the component, such as color 332. In addition, the application developer may specify the actions 334 that are to be performed when a component is utilized. The application development environment may also allow the application developer to specify certain identifying characteristics of a component, such as a component ID 336.

As described above, while developing a component, the component developer need not be aware of how the component will be used in an application. Accordingly, some of the component definition tasks may be delegated to the application developer. Likewise, the application developer may wish to delegate some of the component definition tasks to the deployment environment. As shown in FIG. 3, the application developer has specified the ID attribute 336 of the name/date component to be an auto select field, thus delegating the section of a component ID to the deployment environment.

Application development environment 300 may also include application visualization window 340, which allows the application developer to view what the web pages of the application will look like when viewed within a browser. As shown, the name/date component 312 will appear in a browser just as it appeared during the design of the component with reference to FIG. 2. Similarly, the address component 314 will also be displayed according to that component's definition.

Although not shown, the application developer may also specify the control logic behind the operation of the application. The application developer may specify page flows and business logic that controls those page flows. What should be understood here is that the application developer does not need to have any knowledge of the automated test tool interface. Embodiments of the invention hide the details of the automated test tool interface from the application developer.

Figure 4:
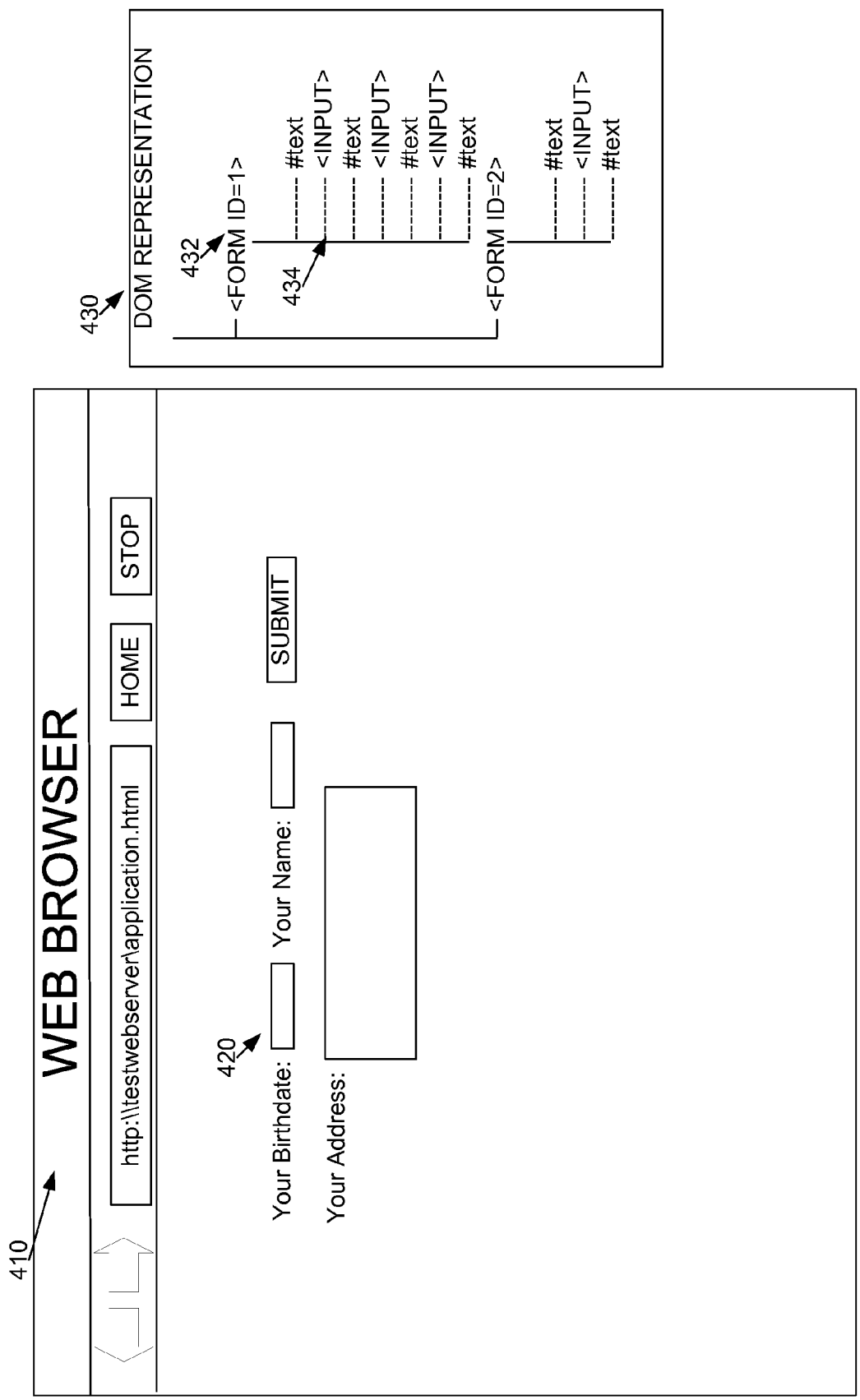
FIG. 4 depicts a graphical representation of an exemplary application test environment.

FIG. 4 depicts a graphical representation of an exemplary application test environment. An application tester may use a web browser 410 in order to test a web application. Although FIG. 4 depicts a single web page of a web application, it should be understood that this is simply for purposes of explanation. The actual web application may have any number of pages and those pages may be dynamically generated as needed by the web server as instructed by the web application.

The application tester may create a test plan in order to test the functionality of the web application. The test plan may include tests for checking the functionality of individual pages of the web application. For example, a portion of a test plan for the web page depicted in FIG. 4 may be:

1. Select the Input Box for Entering the Birth date.
2. Enter an Invalid Date.

Expected Result: Invalid date is rejected.

In order to execute this portion of the test plan, the application tester may use a testing framework. One such exemplary framework is Selenium. The testing framework may provide functionality that aids in developing and executing test plans. For example, the testing framework may provide the tester with the ability to record the testers mouse clicks and keystrokes when executing the test plan. The framework may also allow the tester to playback previously recorded test plans, thus relieving the tester from having to manually execute the test plan again.

Turning to the exemplary application web page of FIG. 4, the tester may start the recording process. The tester may then click input box 420, as specified in the test plan. The tester may then enter an invalid date, as specified in the test plan, and verify that the invalid date is rejected. For purposes of the description of FIG. 4, it will be assumed that the test plan is successful, and that an invalid date is actually rejected.

When recording the execution of the test plan, the testing framework will record the tester's mouse clicks and input text. Typically, the test framework will record the test plan using element locators that are dependent on the DOM of the rendered web page. For purposes of explanation, an exemplary visualization 430 of the DOM of the web page in FIG. 4 is shown. It should be understood that that the exemplary DOM visualization 430 is not actually displayed to the tester, but rather exists in the internals of the web browser.

The testing framework will typically record the tester's actions using a locator, such as an XPATH locator, that is dependent on the DOM 430, and therein lies one of the deficiencies of existing testing frameworks. For example, in the test plan described above, the tester first clicks on the input box associated with the birth date element. As was described in the previous figures, the name/date component is defined as a form 432. The first input element 434 of the form is the input box for entering the birth date. Thus, existing testing framework may record the test using an XPATH locator that is similar to /html/body/form[0]/element[1]. This locator can be described as: in the html document, in the body section, in the first form section, the second input element (Note: in the description, element numbering starts at 0). The testing framework may also record that the element was clicked, and the keystrokes that make up the invalid date that was entered by the tester. The testing framework may also record the results of the test.

As should be clear, the recorded test, absent embodiments of the present invention, is highly dependent on how the web page is rendered in the DOM 430. For example, if the name/date component is altered such that the birth date input element 434 is no longer the second element in the DOM 430, the recorded test may break. If there is any change to the DOM 430, the recorded test may break. A change to the DOM 430 will be described further with respect to FIG. 6.

Embodiments of the present invention do not use element locators that are dependent on the DOM 430 representation of a web page. Rather than using a locator such as an XPATH locator, embodiments of the invention use the API that was published by the component developer to retrieve a locator that is independent of the DOM 430 representation. For example, in an embodiment of the invention, the testing framework will utilize the API described in FIG. 2, and send to that API the DOM 430 dependent representation of the element that was clicked. The API will then return a stable locator to the testing framework, where the stable locator is independent of the DOM. As described above, the stable locator associated with the second element of the name/date component is identified as "date." The testing framework may then record this stable locator as opposed to a DOM 430 dependent locator. It should be noted that the format of the stable locator described above is merely exemplary and is intended for ease of explanation. The stable locator can be in any suitable format. What should be understood is that the stable locator, regardless of the format, identifies an element of a component independent of the DOM representation. The use of the stable locator will be described in further detail with respect to FIG. 6.

Figure 5:
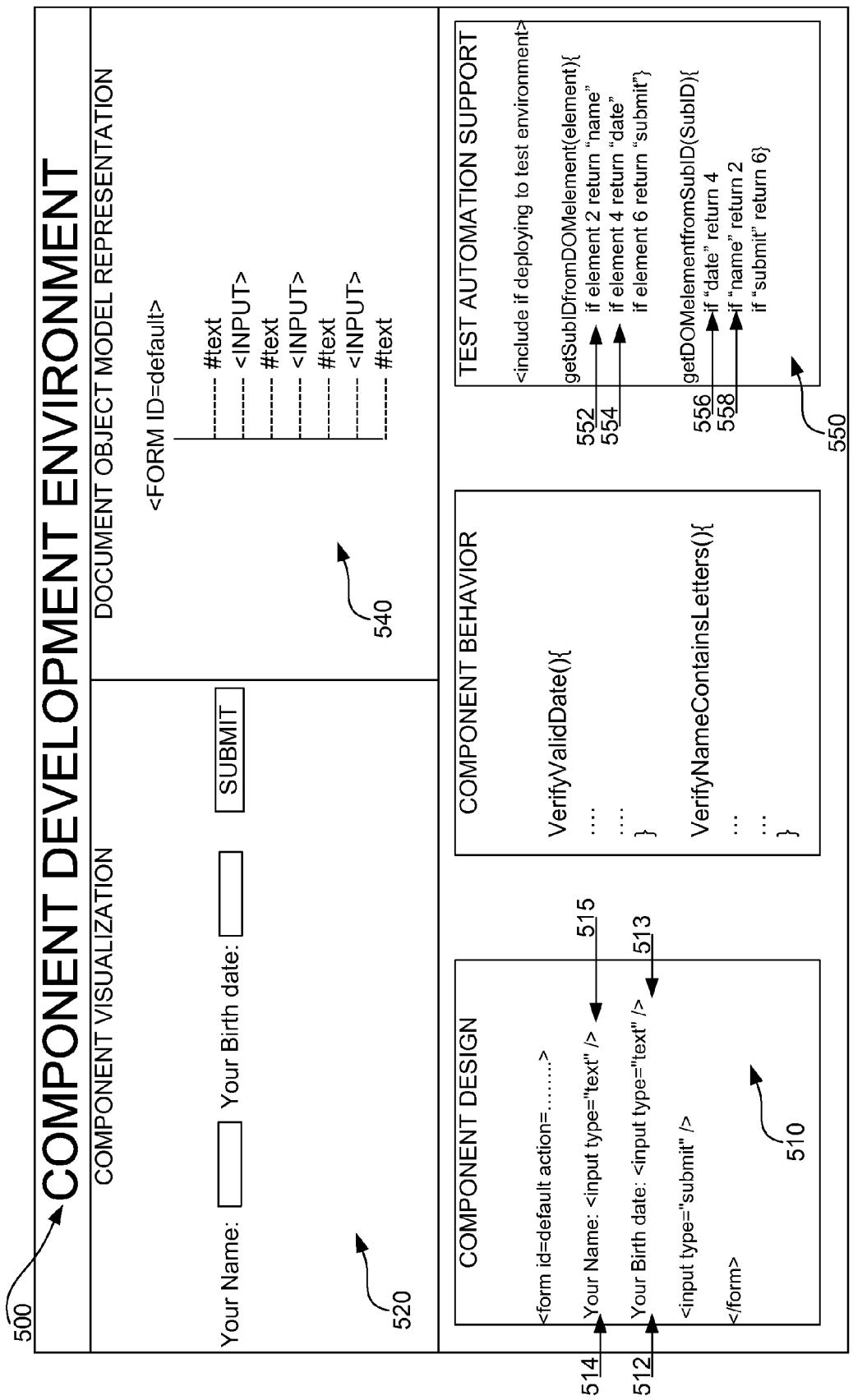
FIG. 5 depicts a graphical representation of an exemplary component development environment, with modifications to an existing component.

FIG. 5 depicts a graphical representation of an exemplary component development environment, with modifications to an existing component. The component development environment 500 depicted in FIG. 5 is essentially the same as that depicted in FIG. 2. At some point, for example due the identification of bugs, changes may be made to the component. In the example depicted in FIG. 5, the component developer may have decided to alter the component such that the first input box is no longer the birth date, but rather is the name. Just as when designing the component, the component developer may specify the component in the component design window 510, with the name element 514,515 first. This change is reflected in the component visualization window 520 and the DOM representation window 540 as well.

As described above, the component developer is in the best position to know how the component will be represented in the DOM, because the component developer has full control over the component. When the component developer changes the order of the input elements, the automated test tool interface can be changed as well. For example, given the changes to the component described above, the component developer will use the test automation support window 550 to alter the published API. In this case, the first input box 515 is the second element in the DOM representation, and is now associated with the "name" 552 stable locator. Likewise, the birth date input box 513 is now the fourth element in the DOM, and the API is altered to reflect that the stable locator associated with the fourth element is the "date" locator 554.

The API is also modified such that when the stable locator is input, the proper DOM element is returned. As shown in the example, the "date" stable locator 556 is modified to return the fourth DOM element, while the "name" stable locator is modified to return the second DOM element. As mentioned above, although DOM representations are being described as simple integers, this is for purposes of simplicity of explanation, and is not intended to be limiting. The utilization of these changes will become more clear with respect to FIG. 6.

Figure 6:
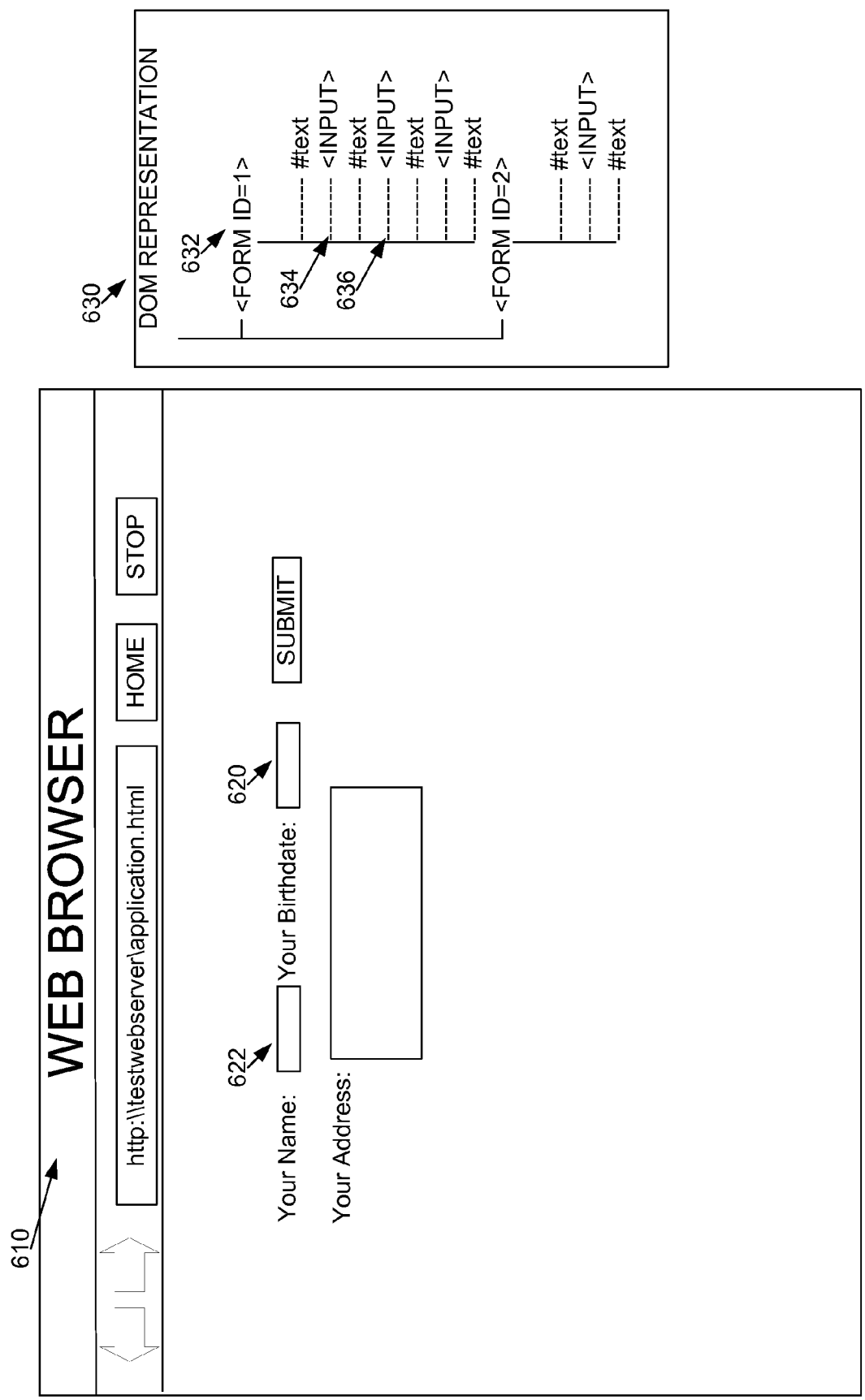
FIG. 6 depicts a graphical representation of an exemplary application test environment, that uses a modified component.

FIG. 6 depicts a graphical representation of an exemplary application test environment, that uses a modified component. In other words, FIG. 6 depicts the web application after the component developer has made changes to the name/date component, as described in FIG. 5. As can be seen in the browser window 610, the birth date input element 620 now appears after the name input element 622. This change causes a corresponding change in the DOM 630 of the web page. The second element 634 is no longer the birth date input box, but rather is the name input box. The birth date input box is now the fourth 636 DOM element.

As should be clear, the movement of the input elements within the DOM 630 would cause prior recorded tests to break, absent embodiments of the present invention. The previously described XPATH locator /html/body/form[0]/element[1] still refers to the second input element of the form 632, however the second input element is no longer the birth date element. Thus, when the testing framework replays the recorded test, the element referred to will be incorrect. The testing framework will attempt to input keystrokes representing an invalid date into a filed that is now the name. At minimum, this is a problem because it bears no relationship to the original test plan. Also, the expected results no longer make sense, as the input is no longer related to the originally recorded test plan.

Embodiments of the present invention advantageously avoid this problem through the use of the stable locators. As mentioned above, rather than recording the DOM dependent representation of an element, embodiments of the invention utilize an API of the component to retrieve a stable locator. When playing back previously recorded tests, the testing framework again makes use of the API to retrieve the DOM representation of the element referred to by the stable locator. In this case, when playing back the recorded test, the testing framework will access the component API and pass the stable locator "date." The component, through the API, that was modified as described in FIG. 5, receives the stable locator "date." As specified by the component developer, the date element is now the fourth element as represented by the DOM, thus an identifier indicating the fourth element is returned.

The testing framework then utilizes the returned DOM dependent identifier to playback the previously recorded test. Thus, the testing framework plays back the recorded keystrokes and directs the keystrokes to the fourth input element, which is now the birth date element. Tests recorded using the original DOM representation no longer break when the DOM changes. Rather, an identifier that remains stable regardless of DOM representation is recorded. Thus, changes to the DOM are transparent to the testing framework, and the identifiers that are used in recording test more directly relate to the functionality being tested, rather than the particular DOM representation of a component.

Figure 7:
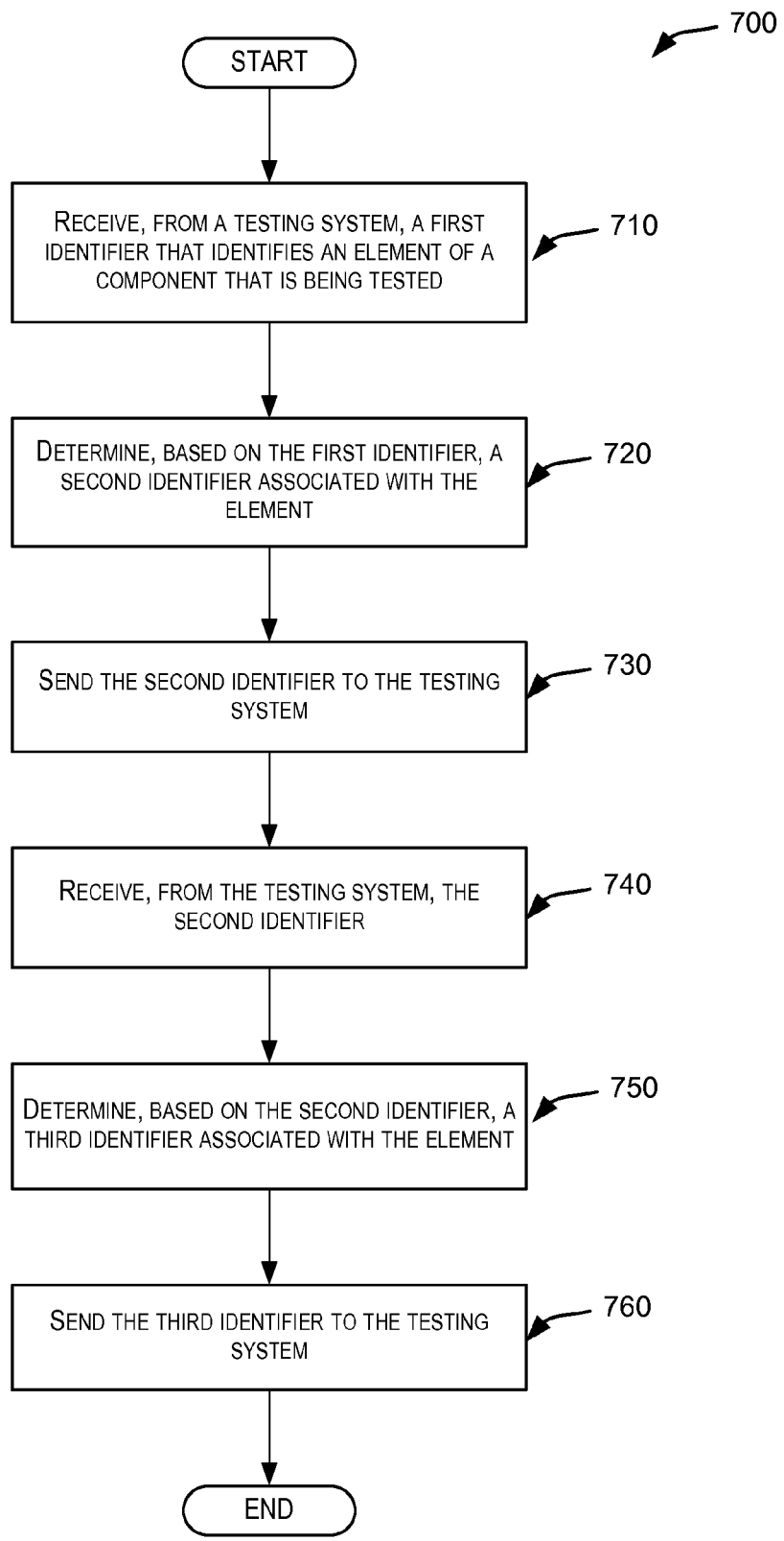
FIG. 7 depicts a simplified flowchart showing the operation of a component embodying an automated test tool interface.

FIG. 7 depicts a simplified flowchart showing the operation of a component embodying an automated test tool interface. The process 700 may begin at step 710, wherein a first identifier that identifies an element of a component that is being tested is received from a testing system. As described above, this first identifier may be the DOM representation of the element as it is being displayed to the application tester.

The process then may continue to step 720, wherein based on the first identifier, a second identifier that is associated with the element is determined. As described, the testing framework may utilize an API published by the component to determine a stable locator that is not dependent on the DOM representation of the component. The process may then continue on to step 730, wherein the second identifier is returned to the testing system. As described, the second identifier may be the stable locator.

The process may then continue on to step 740. In step 740, the second identifier may be received from a testing system. As described above, the second identifier may be the stable locator. Although step 740 occurs after step 730, this does not imply that step 740 occurs immediately after step 730. Rather there can be a delay between step 730 and step 740, in which changes to the component may occur. For example, step 730 may occur during the test recording phase of the test plan, while step 740 occurs during recorded test playback.

From the second identifier, a third identifier associated with the element is determined in step 750. As described above, this third identifier may be determined based on the API published by the component. The third identifier may again be a representation of the element that is DOM dependent. At step 760, the third identifier, which is DOM dependent, may be sent to the testing system.

Figure 8:
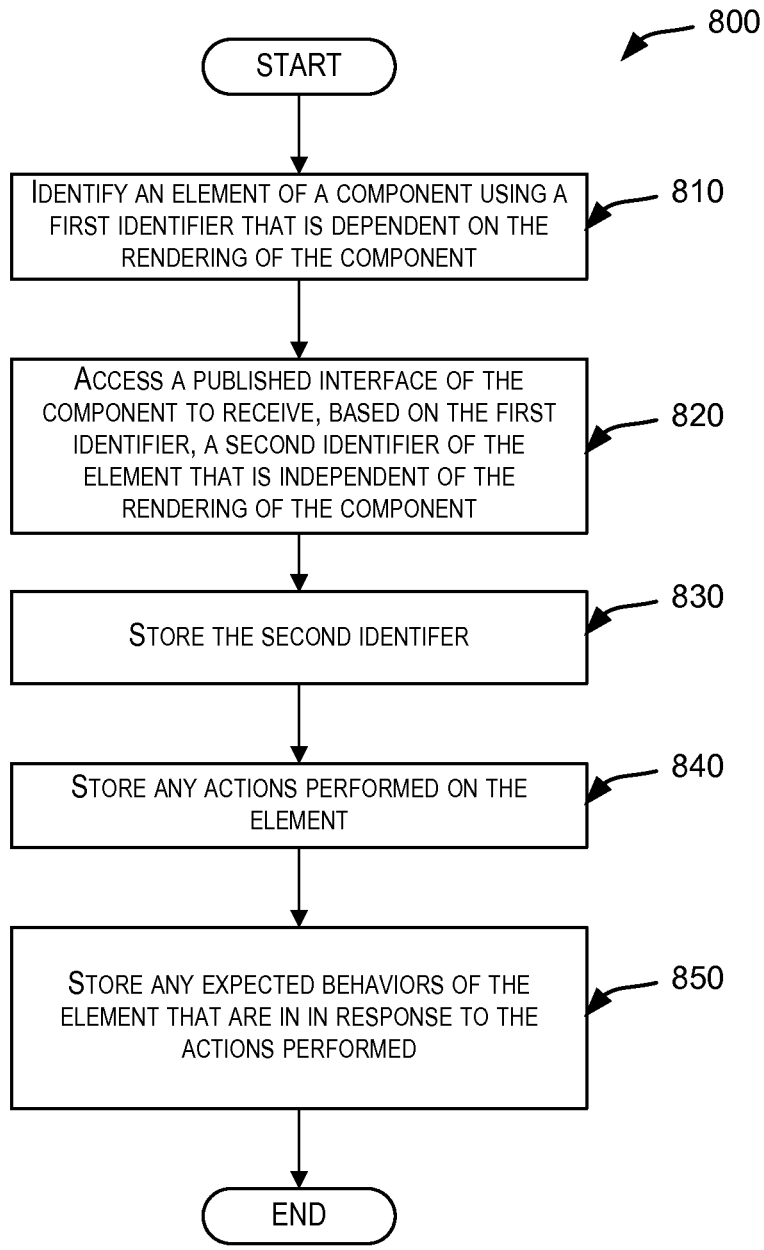
FIG. 8 depicts a simplified flowchart showing the operation of a test framework interacting with a component during the recording phase of a test script.

FIG. 8 depicts a simplified flowchart showing the operation of a test framework interacting with a component during the recording phase of a test. The process 800 may begin at step 810, wherein an element of a component is identified using a first identifier that is dependent on the DOM representation of the component. For example, the first identifier may be an XPATH locator of the element of the component.

At step 820, a published interface of the component may be accessed to receive, based on the first identifier, a second identifier that is independent of the rendering of the component. For example, the second identifier may be a stable locator that is associated with the component, and is independent of the DOM representation of the component. At step 830, the second identifier may be stored by the testing framework. At step 840, actions performed on the element may be stored. For example, this may include mouse clicks and keystrokes that are directed to the element. At step 850, the expected behavior of the element that are in response to the actions performed on the element are recorded. For example, this may be the response of the application to the input provided in step 840.

Figure 9:
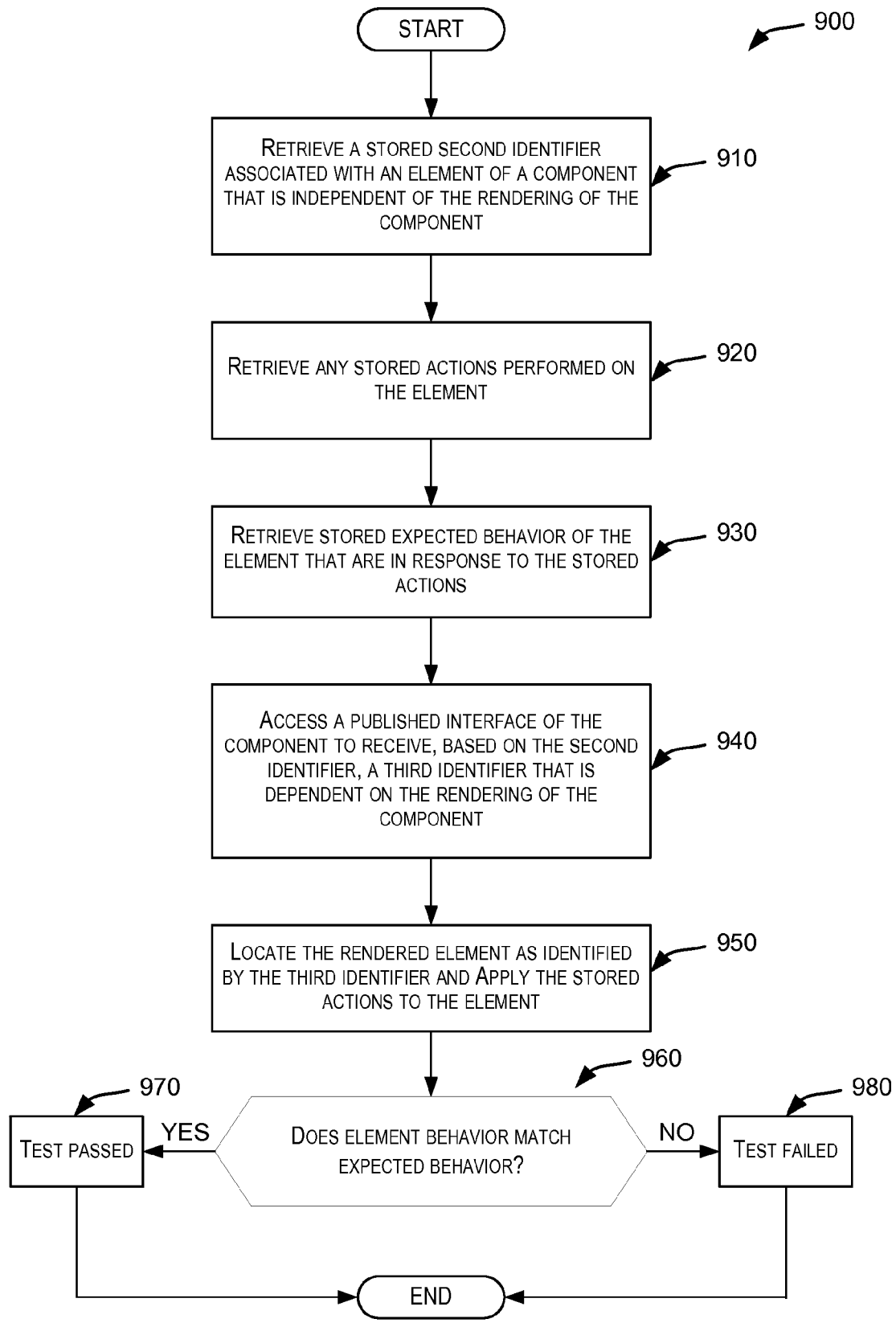
FIG. 9 depicts a simplified flowchart showing the operation of a test framework interacting with a component during a test script playback phase.

FIG. 9 depicts a simplified flowchart showing the operation of a test framework interacting with a component during a test playback phase. The process 900 may being at step 910, wherein a stored second identifier that is associated with an element and that is independent of the rendering of a component is retrieved. For example, the stable locator that was stored when a test was recorded may be retrieved.

At step 920, the stored actions performed on the element, that is the test input, may be retrieved. At step 930, the expected behavior of the element that is in response to the actions performed on the element are retrieved. Again, this may be the response of the element to the previously recorded test input. At step 940, the published interface of the component is accessed, and a third identifier that is dependent on the rendering of the component is retrieved. The third identifier is retrieved based on the second identifier. As described, the second identifier may be the stable locator, and an API of the component may be accessed to retrieve a third identifier, which is a DOM dependent representation of the element identified by the stable locator.

At step 950, the previously retrieved stored actions may be applied to the element as identified by the third identifier. For example, the element that is identified by the third identifier is located in the DOM. The actions are then applied to the located DOM element. At step 960, the element behavior is compared with the previously recorded expected behavior. If the behavior matches, the process moves on to step 970, wherein the test is considered to have passed. If the behavior does not match, the process moves on to step 980, wherein the test fails.

Figure 10:
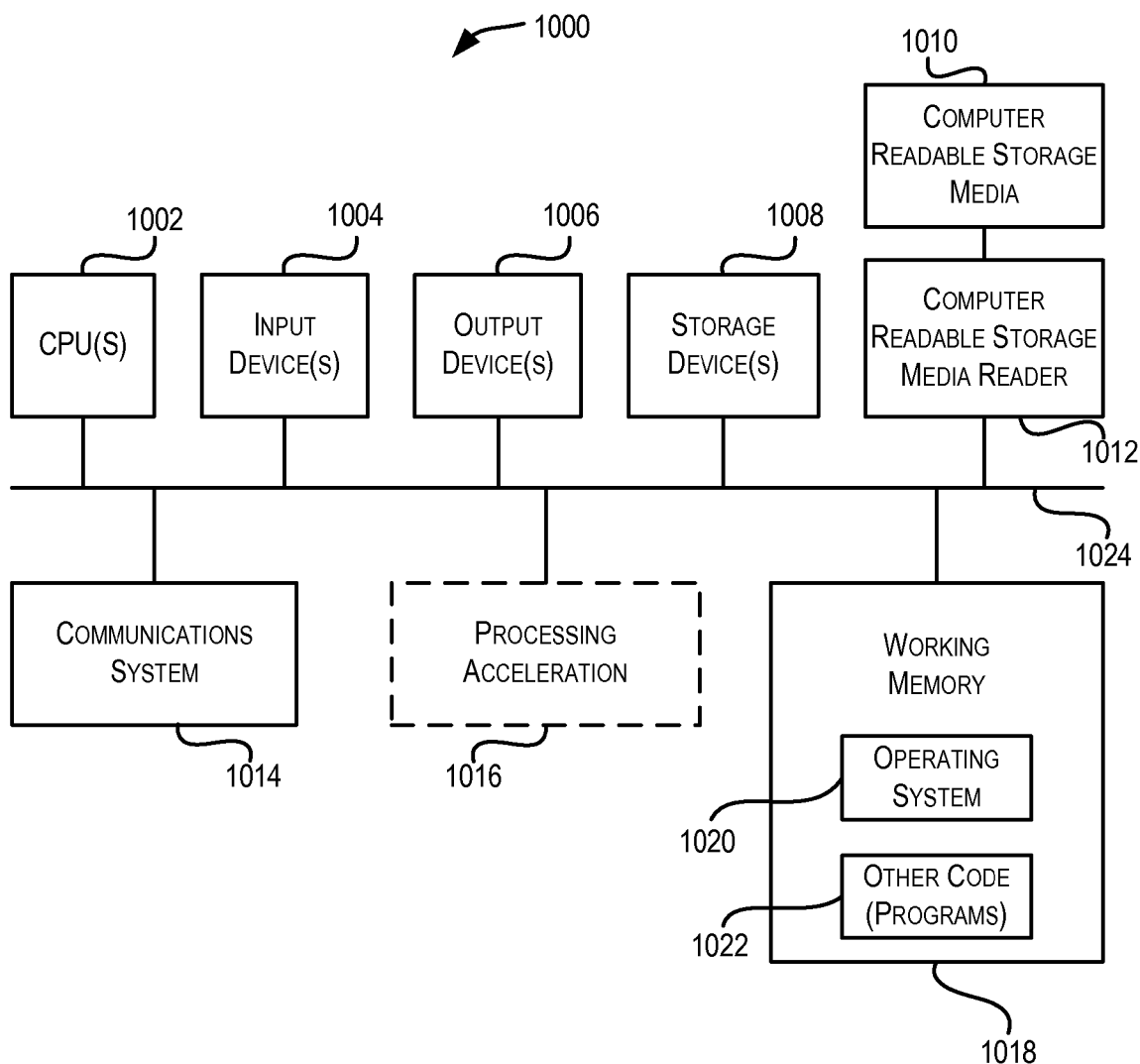
FIG. 10 is a simplified block diagram illustrating physical components of a computer system that may incorporate an embodiment of the present invention.

FIG. 10 is a simplified block diagram illustrating physical components of a computer system that may incorporate an embodiment of the present invention. Computer system 1000 may for example be used to execute an Integrated Development Environment such as JDeveloper, which is an exemplary development environment usable with embodiments of the present invention. Computer system 1000 may also run any of a variety of server applications and/or mid-tier applications, including web servers, Java virtual machines, application servers, database servers, testing frameworks, and the like. Computer system 1000 may be used as any of the systems depicted in FIG. 1.

As shown in FIG. 10, computer system 1000 comprises hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). Computer system 1000 may also include one or more storage devices 1008. By way of example, storage device(s) 1008 may include devices such as disk drives, optical storage devices, and solid-state storage devices such as a random access memory (RAM) and/or a read-only memory (ROM), which can be programmable, flash-updateable and/or the like. Storage devices 1008 may include non-transitory computer readable storage medium.

Computer system 1000 may additionally include a non-transitory computer-readable storage media reader 1012, a communications subsystem 1014 (e.g., a modem, a network card (wireless or wired), an infra-red communication device, etc.), and working memory 1018, which may include RAM and ROM devices as described above. In some embodiments, computer system 1000 may also include a processing acceleration unit 1016, which can include a digital signal processor (DSP), a special-purpose processor, and/or the like.

Computer-readable storage media reader 1012 can further be connected to a non-transitory computer-readable storage medium 1010, together (and, optionally, in combination with storage device(s) 1008) comprehensively representing remote, local, fixed, and/or removable storage devices plus storage media for temporarily and/or more permanently containing computer-readable information.

Communications system 1014 may permit data to be exchanged with a network or other computer systems. The network may be any type of network that can support data communications using any of a variety of commercially-available protocols, including without limitation TCP/IP, SNA, IPX, AppleTalk, and the like. Merely by way of example, network may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks. Various different communication protocols may be used.

Computer system 1000 may also comprise software elements, shown as being currently located within working memory 1018, including an operating system 1020 and/or other code 1022, such as an application program (which may be a client application, Web browser, Web server, mid-tier application, RDBMS, testing framework, etc.). It should be appreciated that alternative embodiments of computer system 1000 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code or instructions executable by a computer system (such as a computer system 1000) and may be stored on a non-transitory computer- or machine-readable storage media. Machine-readable storage media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A non-transitory computer-readable storage medium storing a plurality of instructions for controlling a processor to generate automated test tool interfaces, the plurality of instructions comprising:

instructions that cause the processor to receive information defining one or more functions that convert between a Document Object Model dependent representation of an element of a component and a Document Object Model independent representation of the element of the component;

instructions that cause the processor to generate one or more interfaces of the component based on the information defining the one or more functions;

instructions that cause the processor to provide the Document Object Model independent representation of the element of the component based on accessing at least one of the one or more interfaces, wherein the instructions that cause the processor to provide the Document Object Model independent representation of the element of the component comprise:

instructions that cause the processor to receive, from a testing system, a first identifier that identifies the element of the component that is being tested;

instructions that cause the processor to determine, based on the first identifier, a second identifier associated with the element; and instructions that cause the processor to send the second identifier to the test system; and instructions that cause the processor to provide a Document Object Model dependent representation of the element of the component based on accessing at least one of the one or more interfaces.

2. The non-transitory computer-readable storage medium of claim 1 wherein the instructions that cause the processor to provide the Document Object Model dependent representation of the element of the component further comprise:

instructions that cause the processor to receive, from the testing system, the second identifier;

instructions that cause the processor to determine, based on the second identifier, a third identifier associated with the element; and instructions that cause the processor to send the third identifier to the testing system.

3. The non-transitory computer-readable storage medium of claim 2, wherein the first identifier is a first XPATH locator which identifies the element according to a Document Object Model rendering of the component.

4. The non-transitory computer-readable storage medium of claim 3 wherein the second identifier is a stable locator that is independent of the Document Object Model rendering of the component.

5. The non-transitory computer-readable storage medium of claim 4, wherein the third identifier is a second XPATH locator that identifies the element according to the Document Object Model rendering of the component.

6. The non-transitory computer-readable storage medium of claim 5, wherein the first XPATH locator and the second XPATH locator are the same.

7. The non-transitory computer-readable storage medium of claim 6, wherein the instructions that cause the processor to determine the second identifier includes:
   instructions that cause the processor to access a published interface of the component to determine the second identifier.

8. The non-transitory computer-readable storage medium of claim 7, wherein the instructions that cause the processor to determine the third identifier includes:
   instructions that cause the processor to access the published interface of the component to determine the third identifier.

9. The non-transitory computer-readable storage medium of claim 8, wherein the testing system stores the second identifier.

10. The non-transitory computer-readable storage medium of claim 9, wherein the component is an HTML component.

11. The non-transitory computer-readable storage medium of claim 9, wherein the component is an ADF Faces component.

12. The non-transitory computer-readable storage medium of claim 9, wherein the published interface of the component is not included when the component is deployed to a production web server.

13. A method comprising:
   receiving, with a computer, information defining one or more functions that convert between a Document Object Model dependent representation of an element of a component and a Document Object Model independent representation of the element of the component;
   generating, with the computer, one or more interfaces of the component based on the information defining the one or more functions;
   providing, with a computer, the Document Object Model independent representation of the element of the component based on accessing at least one of the one or more interfaces, wherein providing the Document Object Model independent representation of the element of the component comprises:
      receiving, from a testing system, a first identifier that identifies the element of the component that is being tested;
      determining, based on the first identifier, a second identifier associated with the element; and
      sending the second identifier to the test system; and
   providing, with the computer, a Document Object Model dependent representation of the element of the component based on accessing at least one of the one or more interfaces.

14. The method of claim 13, wherein providing the Document Object Model dependent representation of the element of the component further comprises:
   receiving, from the testing system, the second identifier;
   determining, based on the second identifier, a third identifier associated with the element; and
   sending the third identifier to the testing system.

15. A system comprising:
   a processor; and
   a memory coupled to the processor, the memory containing a set of instructions which when executed by the processor cause the processor to:
      receive information defining one or more functions that convert between a Document Object Model dependent representation of an element of a component and a Document Object Model independent representation of the element of the component;
      generate one or more interfaces of the component based on the information defining the one or more functions;
      provide the Document Object Model independent representation of the element of the component based on accessing at least one of the one or more interfaces, wherein to provide the Document Object Model independent representation of the element of the component the processor is caused to:
         receive, from a testing system, a first identifier that identifies the element of the component that is being tested;
         determine, based on the first identifier, a second identifier associated with the element; and
         send the second identifier to the test system; and
      provide a Document Object Model dependent representation of the element of the component based on accessing at least one of the one or more interfaces.

16. The system of claim 15 wherein the set of instructions that cause the processor to provide the Document Object Model dependent representation of the element of the component further comprises instructions that cause the processor to:
   receive, from the testing system, the second identifier;
   determine, based on the second identifier, a third identifier associated with the element; and
   send the third identifier to the testing system.

17. The system of claim 15 wherein the first and third identifiers are XPATH locators and the second identifier is a stable locator.

* * * * *

UNITED STATES PATENT AND TRADEMARK OFFICE
CERTIFICATE OF CORRECTION

| | | |
|---|---|---|
| PATENT NO. | : 8,924,934 B2 | Page 1 of 1 |
| APPLICATION NO. | : 13/021668 | |
| DATED | : December 30, 2014 | |
| INVENTOR(S) | : Sullivan et al. | |

It is certified that error appears in the above-identified patent and that said Letters Patent is hereby corrected as shown below:

On Title Page 2, column 2, under Other Publications, line 2, delete "corn" and insert -- com --, therefor.

In the Drawings:
On sheet 8 of 10, in figure 8, under Reference Numeral 830, line 1, delete "IDENTIFER" and insert -- IDENTIFIER --, therefor.

In the Specification:
In column 3, line 56, delete "invention;" and insert -- invention. --, therefor.

In column 13, line 18, delete "that that" and insert -- that --, therefor.

In column 14, line 61, delete "filed" and insert -- field --, therefor.

Signed and Sealed this
Eighth Day of September, 2015

Michelle K. Lee
*Director of the United States Patent and Trademark Office*